United States Patent
Lacaze et al.

(10) Patent No.: US 10,405,287 B1
(45) Date of Patent: Sep. 3, 2019

(54) COVERT TIMING SYNCHRONIZATION

(71) Applicants: Alberto Daniel Lacaze, Potomac, MD (US); Karl Murphy, Rockville, MD (US)

(72) Inventors: Alberto Daniel Lacaze, Potomac, MD (US); Karl Murphy, Rockville, MD (US)

(73) Assignee: Robotic Research, LLC

( * ) Notice: Subject to any disclaimer, the term of this patent is extended or adjusted under 35 U.S.C. 154(b) by 232 days.

(21) Appl. No.: 15/597,831

(22) Filed: May 17, 2017

Related U.S. Application Data

(60) Provisional application No. 62/367,601, filed on Jul. 27, 2016.

(51) Int. Cl.
*H04W 56/00* (2009.01)
*H04L 7/00* (2006.01)

(52) U.S. Cl.
CPC ....... *H04W 56/001* (2013.01); *H04W 56/003* (2013.01); *H04L 7/0016* (2013.01); *H04W 56/004* (2013.01); *H04W 56/0065* (2013.01)

(58) Field of Classification Search
CPC ............. H04W 56/001; H04W 56/003; H04W 56/0015; H04W 56/004; H04W 56/0055; H04W 56/0065; H04W 56/008; H04L 7/0016
See application file for complete search history.

(56) References Cited

U.S. PATENT DOCUMENTS

| | | | | |
|---|---|---|---|---|
| 6,961,398 B2 * | 11/2005 | Dick | ..................... | H04B 1/7073 375/356 |
| 8,929,191 B2 * | 1/2015 | Yamamoto | .......... | H04L 27/2655 370/203 |
| 9,236,967 B1 * | 1/2016 | Mustiere | ............... | H04J 3/0667 |
| 9,813,877 B1 * | 11/2017 | Chrabieh | .............. | H04W 4/043 |
| 9,954,669 B2 * | 4/2018 | Perez-Cruz | ........... | H04L 7/0008 |
| 9,973,292 B2 * | 5/2018 | Aweya | .................. | H04J 3/0661 |
| 2007/0040739 A1 * | 2/2007 | Small | ........................ | G01S 1/24 342/357.42 |
| 2007/0159354 A1 * | 7/2007 | Rosenberg | ........... | G08G 1/0965 340/902 |

(Continued)

FOREIGN PATENT DOCUMENTS

JP 5260408 B2 * 8/2013 ............ H04W 56/00

Primary Examiner — Un C Cho
Assistant Examiner — Shah M Rahman
(74) Attorney, Agent, or Firm — Radha Narayanan

(57) ABSTRACT

A signal is emitted by an unrelated, non-cooperating party. The SA scans this spectrum, and selects and filters to a portion of the signal emitted. The SA, using its internal clock, time tags a sequence of peaks of the time domain of the filtered signal. The SA sends (over the internet or other method) the time tagged peaks, frequency and location of the emission to the IN. The IN receives the message from the SA. It compares the peaks with its own data, collected using its local antenna at the specified frequency. The IN uses its location, and the location encoded in the message, to compute the different time of arrival of the signal, and uses the locally found peaks at that frequency to determine a "phase shift." The phase shift is used to calculate the local clock skew. The SA repeats step 2, selecting a different frequency.

17 Claims, 2 Drawing Sheets

(56) References Cited

U.S. PATENT DOCUMENTS

| | | | | |
|---|---|---|---|---|
| 2012/0056781 | A1* | 3/2012 | Kong | G01S 19/252 |
| | | | | 342/357.42 |
| 2012/0069943 | A1* | 3/2012 | Lim | H04J 3/0641 |
| | | | | 375/371 |
| 2013/0080817 | A1* | 3/2013 | Mihelic | G06F 1/12 |
| | | | | 713/401 |
| 2015/0173034 | A1* | 6/2015 | Rode | H04W 56/001 |
| | | | | 370/330 |
| 2015/0358930 | A1* | 12/2015 | Navalekar | H04W 56/001 |
| | | | | 370/281 |
| 2016/0170440 | A1* | 6/2016 | Aweya | G06F 1/12 |
| | | | | 713/503 |
| 2016/0345179 | A1* | 11/2016 | Chen | H04J 3/0661 |
| 2018/0007078 | A1* | 1/2018 | Motos | H04L 63/08 |
| 2019/0132812 | A1* | 5/2019 | Kindred | G06F 1/12 |

* cited by examiner

COVERT TIMING SYNCHRONIZATION

CROSS REFERENCE TO RELATED APPLICATIONS

This application claims priority from U.S. Patent Application Ser. 62/367,601, entitled "Covert Timing Synchronization", filed on 27 Jul. 2016. The benefit under 35 USC § 119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to accurate clock synchronization. More specifically, the present invention relates to accurate clock synchronization whereby the synchronization authority does not emit RF and is covert.

BACKGROUND OF THE INVENTION

Current power and telecommunication facilities rely on accurate clock synchronization for a variety of basic services. The synchronization is often performed using the GPS constellation, or other satellite-based time providers. An intelligent adversary will see this as a prime vulnerability, and try to exploit it. For an adversary to render the complete constellation of satellites unavailable, a significant event must occur. Possible scenarios include: a significant, ongoing jamming effort; an all-out war with a powerful state adversary, which has incapacitated the satellite constellation; or, some form of Kessler ablation cascade.

Under these circumstances, an intelligent adversary could actively try to deny our forces from maintaining an accurate, synchronized clock. Therefore, it is also possible that the same adversary will try to deactivate ground-based synchronization methods (such as NIST WWVB), since they are easy to find—they emit RF signals that they can be easily tracked or jammed.

A method that does not disclose the location of the synchronization authority will provide significant advantages in these cases, as the system could be mobile, or located in an undisclosed secure location which is not easily discoverable by an adversary. Under the design of the present invention, the synchronization authority does not emit RF; therefore, it would be significantly easier to covertly emplace.

In the present invention, any emission, even the jammer's signal, can be used for accurate synchronization. As signals are emitted, the synchronization authority will use those signals to provide time tags, which are then shared for synchronization.

The system can be distributed and, as a corollary, it can be used to provide localization.

Definitions

WWVB is a time signal radio station near Fort Collins, Colo. and is operated by the National Institute of Standards and Technology (NIST). Most radio-controlled clocks in North America use WWVB's transmissions to set the correct time. The 70 kW ERP signal transmitted from WWVB is a continuous 60 kHz carrier wave, the frequency of which is derived from a set of atomic clocks located at the transmitter site, yielding a frequency uncertainty of less than 1 part in 1012. A one-bit-per-second time code, which is based on the IRIG "H" time code format and derived from the same set of atomic clocks, is then modulated onto the carrier wave using pulse width modulation and amplitude-shift keying. A single complete frame of time code begins at the start of each minute, lasts one minute, and conveys the year, day of year, hour, minute, and other information as of the beginning of the minute. WWVB is co-located with WWV, a much older time signal station that broadcasts on multiple short wave frequencies. While most time signals encode the local time of the broadcasting nation, the United States spans multiple time zones, so WWVB broadcasts the time in Coordinated Universal Time (UTC). Radio-controlled clocks can then apply time zone and daylight saving time offsets as needed to display local time.

Radio frequency (RF) is any of the electromagnetic wave frequencies that lie in the range extending from around 3 kHz to 300 GHz, which include those frequencies used for communications or radar signals. RF usually refers to electrical rather than mechanical oscillations.

SUMMARY OF THE INVENTION

The present invention is a system and method for covert timing synchronization. A commercial TV/radio signal is emitted by an unrelated, non-cooperating party. The SA scans this spectrum, and selects and filters with a narrow notch filter to a portion of the signal emitted (how this frequency is selected will be explained later). The SA, using its internal clock, time tags a sequence of peaks of the time domain of the filtered signal. The SA sends (over the internet or other method) the time tagged peaks, frequency and location of the emission to the IN. The IN receives the message from the SA. It compares the peaks with its own data, collected using its local antenna at the specified frequency. The IN uses its location, and the location encoded in the message, to compute the different time of arrival of the signal, and uses the locally found peaks at that frequency to determine a "phase shift." The phase shift is used to calculate the local clock skew. The SA repeats step 2, selecting a different frequency.

The task of the SA is to select a signal from the emitted commercial or military spectrum that is suitable for synchronization, time tag the signal, and send it to the IN. The first step is to find an area of the spectrum that is suitable for finding correlations easily detected by the IN. A simple algorithm would be to collect a few milliseconds (ms) of spread spectrum data, check the amplitude, and randomly select any peak over a certain range.

If high levels of synchronization (μs level), then time of flight needs to be taken under consideration. 1 μs is approximately 300 m of light traversal; knowing the location of the emitter is important for accurate time synchronization at the required levels of accuracy. The SA will then use a very narrow notch filter to filter the emissions at the selected frequency. One or more peaks may be extracted. A packet is generated that includes: the center frequency selected, the time of the peak/peaks, and the known lat/long of the emitter. The SA may also include authentication information.

The SA will then repeat the process to find yet another source, frequency, and continue generating these packets and sending them to the INs.

The job of the INs is to match the incoming packets against the features being received by the local antenna. In this case, the SA packet is received by the INs. The INs has a rolling log where it collects the data (the areas on where to collect the information are predetermined or sent by the SA in the previous packet, to minimize the amount of data collected). It uses the center frequency provided by the SA, then filters the locally collected data. Using a peak correlator, it then finds a match. The match provides the time skew after the time of flight between the emission source, and the INs location is used. In normal operations, the local skew will be smaller than a full wave of the carrier frequency selected.

BRIEF DESCRIPTION OF THE DRAWINGS

The accompanying drawings, which are incorporated herein a form a part of the specification, illustrate the present invention and, together with the description, further serve to explain the principles of the invention and to enable a person skilled in the pertinent art to make and use the invention.

FIG. 1 The SA's job is to select unintended emission signals that are suitable for synchronization, time tag them, and send them to the IN.

DETAILED DESCRIPTION OF THE INVENTION

Figure 1:
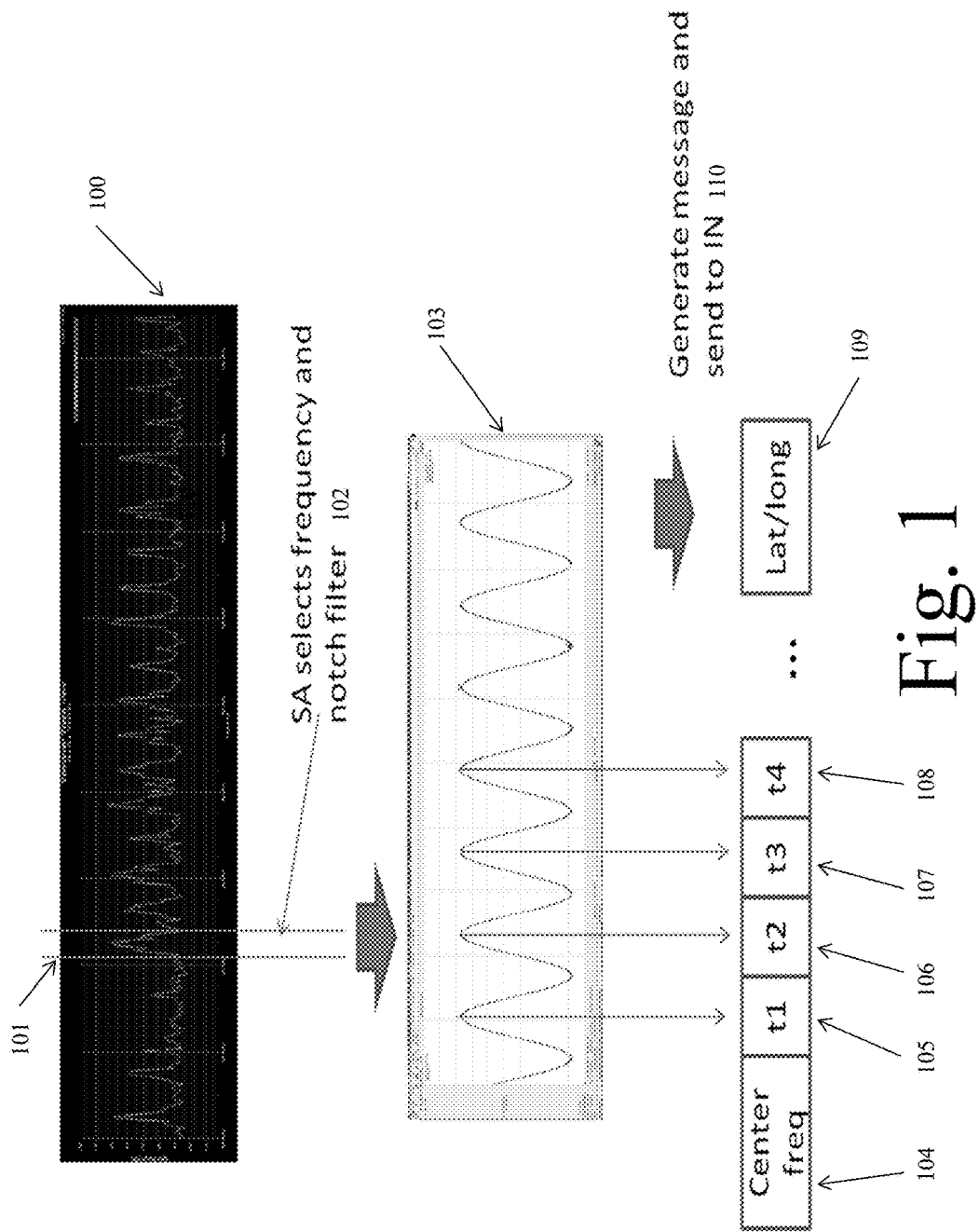

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Disclosed are different embodiments of the present invention. A Synchronization Authority (SA) with a master clock located within the "radio neighborhood" of the installation. The SA has an RF receiver. An INstallation (IN) with a clock. The IN has an RF receiver in the same frequency as the SA. A means of communication between the SA and the IN. For this program, we will assume that this communication is over the internet. This communication does not need to be real-time or high bandwidth. Depending on the quality of the clock at the IN, this communication can be minutes or days late. One or more TV/radio stations emitting within the RF range of the SA and IN receiver.

The system works as follows. A commercial TV/radio signal is emitted by an unrelated, non-cooperating party. For example, using a signal in the 10-100 MHz range (i.e. FM radio station) would work. The SA scans this spectrum, and selects and filters with a narrow notch filter to a portion of the signal emitted (how this frequency is selected will be explained later). The SA, using its internal clock, time tags a sequence of peaks of the time domain of the filtered signal. The SA sends (over the internet or other method) the time tagged peaks, frequency and location of the emission to the IN.

The IN receives the message from the SA. It compares the peaks with its own data, collected using its local antenna at the specified frequency. The IN uses its location, and the location encoded in the message, to compute the different time of arrival of the signal, and uses the locally found peaks 201, 202, 203, 204 at that frequency to determine a "phase shift." The phase shift is used to calculate the local clock skew. The SA repeats step 2, selecting a different frequency.

The task of the SA is to select a signal from the emitted commercial or military spectrum that is suitable for synchronization, time tag the signal, and send it to the IN. The first step is to find an area of the spectrum that is suitable for finding correlations easily detected by the IN. A simple algorithm would be to collect a few milliseconds (ms) of spread spectrum data 100, check the amplitude, and randomly select any peak over a certain range 101. It is also necessary that the SA selects a feature (peak or otherwise) for which the location is known accurately, as this affects the accuracy of the synchronization.

If high levels of synchronization ($\mu$s level), then time of flight needs to be taken under consideration. 1 $\mu$s is approximately 300 m of light traversal; knowing the location of the emitter is important for accurate time synchronization at the required levels of accuracy. The SA will then use a very narrow notch filter to filter the emissions at the selected frequency 102. One or more peaks may be extracted. A packet 103 is generated that includes: the center frequency 104 selected, the time of the peak/peaks 105, 106, 107, 108, and the known lat/long of the emitter 109. The SA may also include authentication information.

The SA will then repeat the process to find yet another source, frequency, and continue generating these packets and sending them to the Ins 110. Although not required, it is expected that the SA will have a high quality clock (Chip Scale Atomic Clock). For example, CSCACs drift less than 1 $\mu$s per year, and therefore, they could maintain the overall network in correct absolute time over long periods of time.

Figure 2:
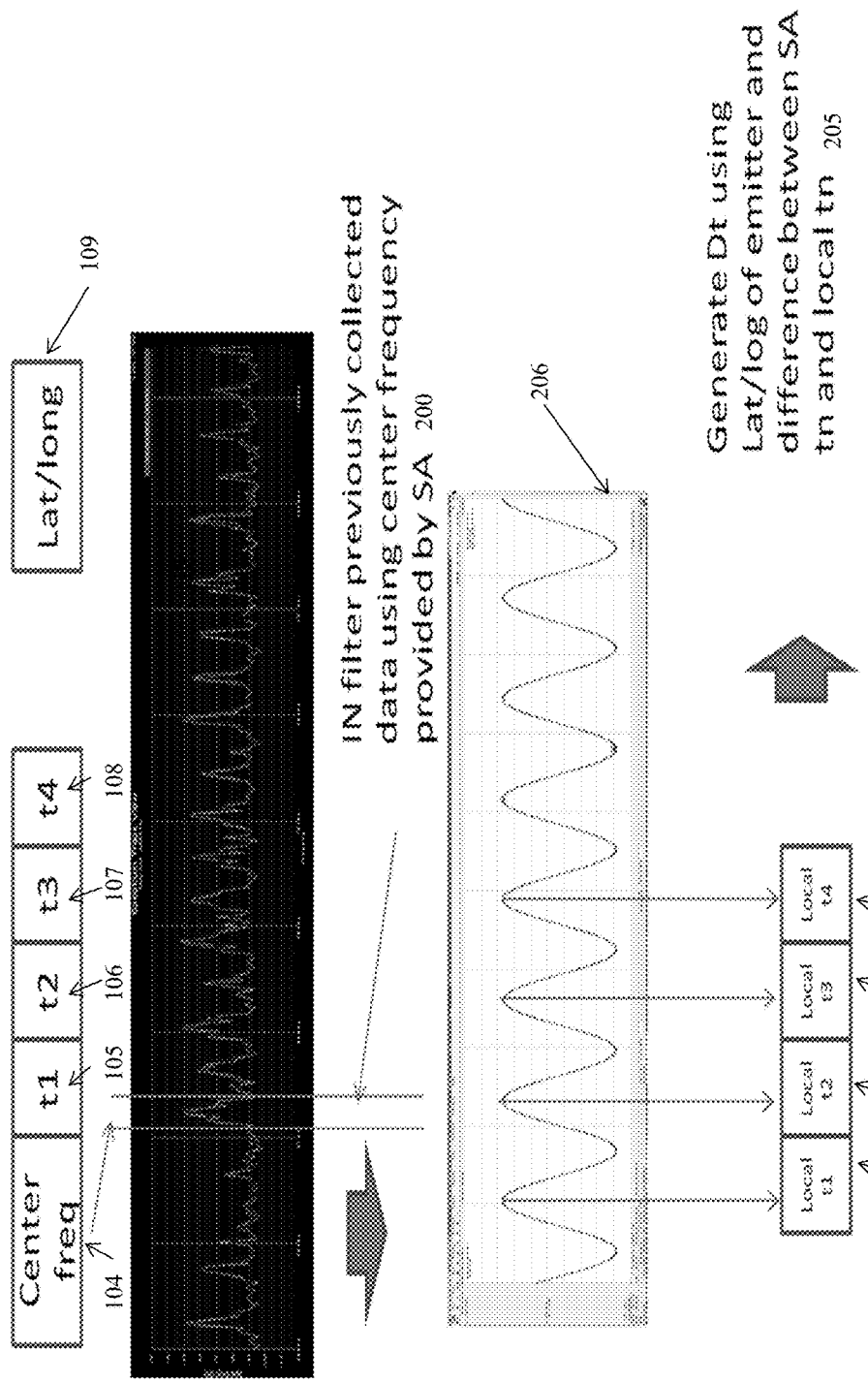
FIG. 2 The INs use the time tagged information to correct the local clock skew.

The job of the INs is to match the incoming packets against the features being received by the local antenna. FIGS. 1 and 2 show the process. In this case, the SA packet is received by the INs. The INs has a rolling log 206 where it collects the data (the areas on where to collect the information are predetermined or sent by the SA in the previous packet 200, to minimize the amount of data collected). It uses the center frequency 104 provided by the SA, then filters the locally collected data 201, 202, 203, and 204. Using a peak correlator, it then finds a match. The match provides the time skew after the time of flight between the emission source, and the INs location is used. In normal operations, the local skew will be smaller than a full wave of the carrier frequency selected. Finally a time different is generated using the lat/long of the emitter and the difference between Sa tn and local tn 205.

In other words, at 10 MHz, the local clock needs to skew less than a 0.05 µs per second, to maintain the solution of the integer ambiguity performing once a second matches. If the matches are more frequent, then, these requirements are relaxed at the cost of more bandwidth.

Typical CPU clocks skew at about 1 ppm or 1 µs per second at constant temperature. Therefore, the local clock needs to be better quality. Fortunately, there are commercial ICs that can easily provide that level of performance at a very low cost. Non CSAC crystals can maintain that level of drift if the temperature is maintained relatively stable. Using lower frequencies (i.e. AM emissions) lowers these requirements, where it may be possible to synchronize to 1 µs with a standard CPU clock. There is a tradeoff between the quality of the sync, the quality of the clock of the IN, and the number of packets that need to be sent.

The data collection requirements at the IN are lowered, by having the SA send in anticipation which frequency it is planning to use for the next packet 200. Therefore, the INs only need to collect a rolling log of the data inside the notch 206 and nowhere else as shown in FIG. 2.

If the INs contains a CSAC, then the skew corrections will only need to be performed once a week or so. In other words, the bandwidth necessary to send the packets is minimal. Actually, this synchronization information could be sent over postal mail, or carried between one site and another, given that the IN has information of notch to be used by the SA and a time span of the future packet.

Distributed Network

The reader has likely assumed at this point that the system has more than a single SA-IN pair. If an SA and an IN are co-located (share the same clock), the system can be used for broadcasting a synchronized clock over areas that extend past the range of the carrier signals of opportunity. The error gets accumulated at every step of the chain, but this is true for all systems being considered.

If multiple SAs are available, the problem of a compromised SA could be easily detected by majority rules implementations.

A network of collocated SA-IN can be used to synchronize large areas.

Localization

Since timing is synchronized between these installations, position can also be derived. A mobile vehicle having the same capabilities as a IN, can determine its position by correlating the different packets received from the different SAs and by having an accurate clock, the vehicle will be able to determine its location.

The system is set to run on a computing device. A computing device on which the present invention can run would be comprised of a CPU, Hard Disk Drive, Keyboard, Monitor, CPU Main Memory and a portion of main memory where the system resides and executes. Any general-purpose computer with an appropriate amount of storage space is suitable for this purpose. Computer Devices like this are well known in the art and are not pertinent to the invention. The system can also be written in a number of different languages and run on a number of different operating systems and platforms.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A system designed to synchronize remote clocks composed of:
 a. a synchronization authority (SA), permanent or mobile, that has access to a clock, to be considered the master clock;
   SA can measure Radio Frequency (RF) emissions;
   the SA can get a signal in the RF emissions;
 b. an installation (IN), permanent or mobile, that has interest in having its clock synchronized with the SA;
   the IN has a clock;
   the IN can also measure RF emissions in the same frequencies as the SA;
   the IN can get a signal in the RF emissions;
 c. a cooperative or uncooperative source of RF emissions that is within range of both SA and IN;
 d. a method for sending information packets between the SA and the IN that encode time of the signals in the RF emissions at the SA;
 e. a method for comparing signals information received at the IN from the SA with signals in the RF emissions received at the IN locally, a delta in the comparing shows a time skew;
 f. the ability of the IN to store either raw signal in RF emissions received and time tagged locally, or the information of time tagged signals from SA;
 g. a known location of the source of RF emissions that is sent to, or known by, both the SA and the IN;
 h. the known location is used to compute the difference time of flight of signals in the RF emissions, from the source to the SA and the source to the IN, to further increase the synchronization accuracy; and
 i. the time of flight from the source to the SA can be subtracted by the SA from the signal time tags, so as to further conceal the location of the SA.

2. The system of claim 1, wherein the method of information exchange between the SA and the IN is converted though cryptology or other means.

3. The system of claim 1, wherein
 the IN solves the integer ambiguity problem by collecting enough measurements, provided by the SA to satisfactory filter.

4. The system of claim 1, wherein
 in step f, all information is recorded; or
 only information of a particular frequency, known by both SA and IN, spectrum is recorded; or
 only a particular part of the spectrum at a particular time range, or ranges, are recorded.

5. The system of ea claim 1, further comprising
 a method for intelligently selecting the frequency spectrum of the emitter by selecting only frequencies above a certain threshold;
   only from known emitters;
   only from emitters that have been authenticated;
   only from emitters for which the location is known;
   only for emitters that are known not to have multipath problems;
   only for emitters that are from friendly/non-friendly forces;
   only for emitters that are known to reach certain set of INs;

only for emitters that are in a particular geolocation; and only for emitters that emit a particular waveform (FM, AM, etc.), or a combination of them.

6. The system of claim 1, further comprising randomly or semi-randomly selecting the frequency being used at the SA; and sending this frequency limits to the INs.

7. The system of claim 1, further comprising having multiple SAs and INs.

8. The system of claim 1, further comprising having a co-located SA-IN that acts as a "repeater" to extend the zone of synchronization.

9. The system of claim 8, further comprising a double check, where each SA-IN checks other SA-INs to detect spoofing.

10. The system of claim 1, further comprising eliminating synchronizations that do not fit within the error profile of the INs clock as outliers, multi-return signals, and possibly spoofers.

11. The system of claim 1, wherein the position of the SA and the emitter is known by the INs.

12. The system of claim 1, wherein signal features used for a correlation are peaks, phases shifts, and quadrature shifts.

13. The system of claim 1, wherein the SA looks for sequences of emissions that are above a certain entropy or certain level of uniqueness.

14. The system of claim 1, wherein the information, for which bandwidth and time will be used for correlation, is either known by both SA and IN, or is transmitted, or shared a priori, to minimize storage needs at the IN.

15. A system designed to synchronize remote clocks composed of:

a. a synchronization authority (SA), permanent or mobile, that has access to a clock, to be considered the master clock;

SA can measure Radio Frequency (RF) emissions;

the SA can find areas in the spectrum that may provide get signal strength degraded below a level to be recognized;

b. an installation (IN), permanent or mobile, that has interest in having its clock synchronized with the SA;

the IN has a clock;

the IN can also measure RF emissions in the same frequencies as the SA;

the IN can correlate signals in the RF emissions;

c. a cooperative or uncooperative source of RF emissions that is within range of both SA and IN;

d. a method for sending information packets between the SA and the IN that encode time and signal at the SA;

e. a method for correlating signals information received at the IN from the SA with the signal sensed locally;

a delta in the correlating shows a time skew;

f. the ability of the IN to store either raw signal in RF emissions received and time tagged locally, or the information of time tagged signals from SA;

g. a known location of the source of RF emissions that is sent to, or known by, both the SA and the IN;

h. the known location is used to compute the difference time of flight of signals in the RF emissions from the source, to the SA and to the IN, to further increase the synchronization accuracy; and i. the time of flight from the source to the SA can be subtracted by the SA from the signal time tags, so as to further conceal the location of the SA.

16. The system of claim 15, wherein the IN is installed on a vehicle that uses its dead reckoning capabilities to find its location.

17. The system of claim 15, wherein a vehicle determines its position by using multiple packets received from multiple SAs; and the system can solve both for time and position given that enough SAs are present and within RF range.

* * * * *